July 6, 1965 D. E. CARR 3,193,488
COMBINED CATALYTIC CRACKING AND CATALYTIC HYDROCRACKING
Filed July 27, 1962
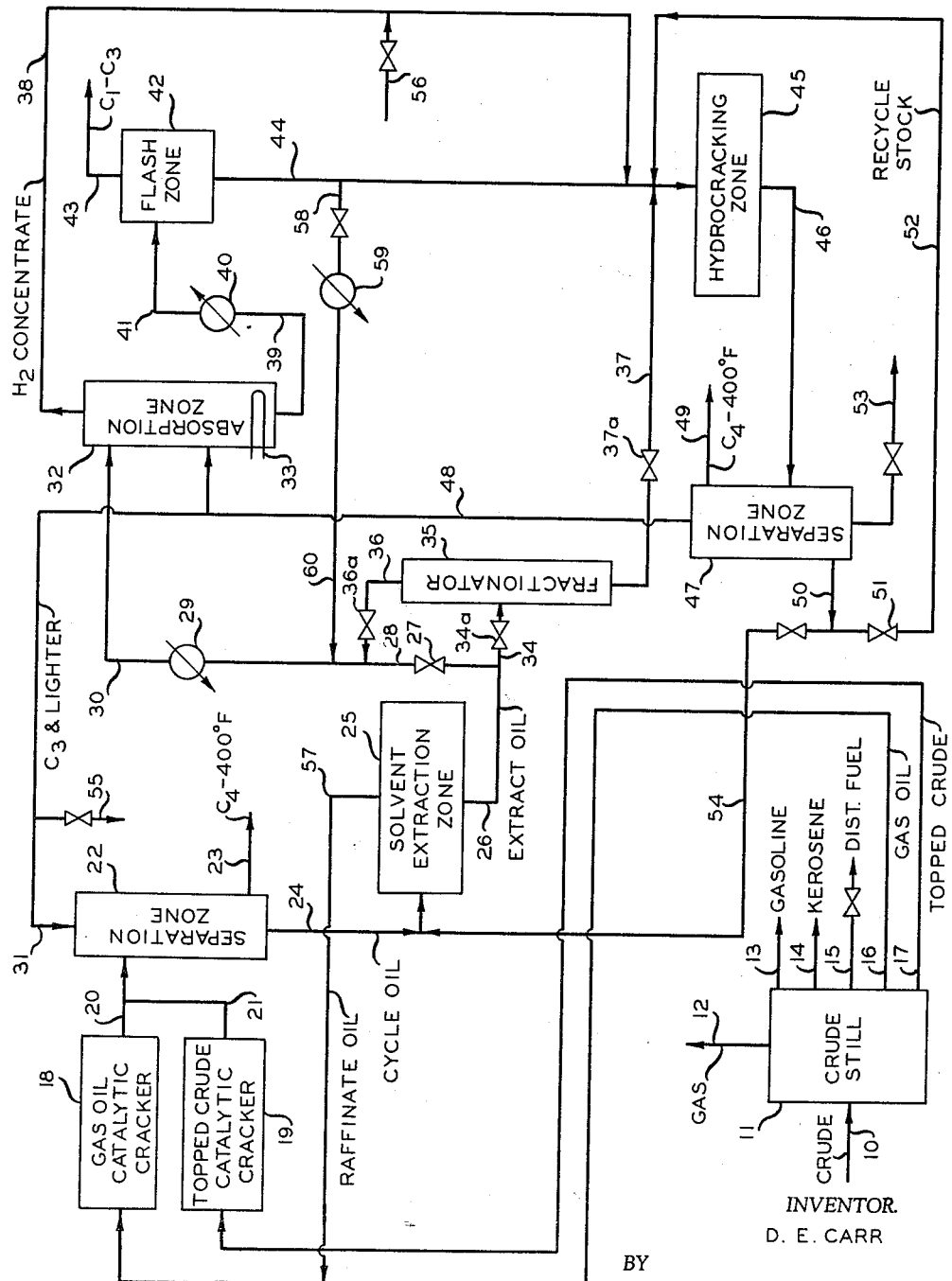
INVENTOR.
D. E. CARR
BY
Young + Quigg
ATTORNEYS.

United States Patent Office 3,193,488
Patented July 6, 1965

3,193,488
COMBINED CATALYTIC CRACKING AND CATALYTIC HYDROCRACKING
Donald E. Carr, Bartlesville, Okla., assignor to Phillips Petroleum Company, a corporation of Delaware
Filed July 27, 1962, Ser. No. 212,815
10 Claims. (Cl. 208—68)

This invention relates to process and apparatus for combined catalytic cracking and catalytic hydrocracking. In one of its aspects, the invention relates to process and apparatus for separately, catalytically cracking a gas oil and a topped crude and for then catalytically hydrocracking an extract oil separated from the cracked stocks with hydrogen separated from these cracked stocks. In another aspect, the invention relates to process and apparatus for recovering gasoline from crude oil wherein there is separated from the crude oil a gas oil and a topped crude, the gas oil and the topped crude are separately catalytically cracked, there are separated from the catalytically cracked stocks a hydrogen-rich stream and an extract oil stream, and the extract oil stream is subsequently catalytically hydrocracked in the presence of thus-separated hydrogen to produce gasoline.

Of the various fractions of a crude oil which can be catalytically cracked to produce gasoline and other valuable by-products, it is known that the heavier aromatic portion, known as aromatic extract, is a very poor catalytic cracking feed stock because of its refractory nature. This fraction is also of low value for other uses, such as for fuel oil. This aromatic extract fraction is useful as a carbon black conversion feed stock; however, few refineries are located favorably to sell the stock for this use. Hydrocracking of aromatic gas oils yields higher octane gasolines than does hydrocracking of a paraffinic gas oil. Unforunately, hydrocracking is not feasible in many cases because of a short supply of hydrogen.

Accordingly, it is an object of this invention to provide process and apparatus wherein a combination of catalytic cracking, solvent extraction, and catalytic hydrocracking are utilized to obtain increased yields of gasoline. It is another object of this invention to utilize the high hydrogen production of topped crude catalytic cracking for hydrocracking an aromatic gas oil to produce gasoline. It is a further object of this invention to provide process and apparatus for separating a hydrogen-rich stream from the effluent of a catalytic cracking process and to utilize this hydrogen-rich stream in the hydrocracking of an aromatic extract oil.

Other aspects, objects and the several advantages of this invention will become apparent upon a study of this disclosure, the drawing, and the appended claims.

According to the invention, there are provided a process and apparatus for up-grading petroleum which comprises (a) Catalytically cracking a topped crude oil,
(b) Catalytically cracking in a separate zone from that of step "a" a gas oil,
(c) Separating a hydrogen-rich gas from the cracked products of steps "a" and "b,"
(d) Solvent extracting the combined cracked products of steps "a" and "b" to produce a raffinite oil comprising paraffins and an extract oil comprising aromatics, and
(e) Utilizing the hydrogen-rich gas of step "c" for catalytically hydrocracking the extract oil of step "d."

There are further provided process and apparatus for increasing the recovery of gasoline from crude oil which comprises (a) Fractionating the crude oil to produce a gas oil and a topped crude,
(b) Catalytically cracking the topped crude,
(c) Catalytically cracking in a separate zone from that of step "b" the gas oil,
(d) Combining the cracked effluents of steps "b" and "c,"
(e) Separating from the combined cracked effluent of step "d" a hydrogen-rich gas and a cycle oil,
(f) Separating the cycle oil by solvent extraction into a raffinate comprising paraffins and an extract oil comprising aromatics, and
(g) Catalytically hydrocracking the extract oil with addition of the hydrogen-rich gas from step "e" to produce a gasoline product.

There are further provided process and apparatus wherein the separating of step "e" above comprises fractionating the combined cracked effluent to produce a $C_3$ and lighter stream, a gasoline product stream, and the cycle oil, scrubbing the $C_3$ and lighter stream with subsequently produced extract oil to absorb therefrom a major portion of the hydrocarbon content of the $C_3$ and lighter stream and to produce as the unabsorbed portion of the $C_3$ and lighter stream the hydrogen-rich gas, and flashing the thus-enriched extract oil to produce a light hydrocarbon product stream and extract oil for charging to the hydrocracking of step "g" above.

The drawing comprises a schematic representation in flow-diagram form of a preferred embodiment of my invention.

Referring now to the drawing in detail, a crude oil is passed by way of conduit 10 to a crude still 11. In this crude still, the oil is separated into various fractions as is known in the art. These fractions, by way of example, can comprise a hydrocarbon-rich gas removed by way of conduit 12, a gasoline fraction removed by way of conduit 13, a kerosene fraction removed by way of conduit 14, and a distillate fuel fraction removed by way of conduit 15. There are further separated a gas oil fraction by way of conduit 16 and a topped crude fraction by way of conduit 17. The gas oil fraction is passed by way of conduit 16 to a catalytic cracker 18, and the topped crude fraction is passed by way of conduit 17 to a second catalytic cracker 19. The effluents of these two catalytic crackers can be separately separated, but it is presently preferred according to my invention that these effluents be combined by way of conduits 20 and 21 and passed to a separation zone 22. In this separation zone, the cracked effluent is fractionated to produce a gasoline product, which can comprise a $C_4$-400° F. product removed by way of conduit 23, for example. The heavier portion of this cracked effluent comprises a cycle oil passed by way of conduit 24 to a solvent extraction zone 25. In zone 25, this cycle oil is extracted with a selective solvent such as sulfur dioxide, furfural, Chlorex, or solvent to produce a relatively paraffinic raffinate oil and a relatively aromatic extract oil. The raffinate oil is removed by way of conduit 57 and can be charged to the gas oil cracker 18, along with the virgin gas oil. Extract oil removed by way of conduit 26 can be used without fractionation as sponge oil in absorption zone 32 by passing this oil through conduits 26 and 28, cooler 29, and conduit 30. However, a presently-preferred sponge oil is preferred by fractionating the wide boiling extract oil in fractionator 35 to produce an overhead fraction boiling initially at about 400–425° F. and having an end point in the range of 500–600° F. According to this latter embodiment, valve 27 is closed and valves 34A and 36A are opened. In either event, the sponge oil enters absorption zone 32 and preferably countercurrently contacts a $C_3$ and lighter stream separated from the cracked effluents in separation zone 22 and passed to the absorption zone 32 by way of conduit 31. In zone 32, the oil absorbs hydrocarbons from this $C_3$ and lighter gas;

the absorption zone 32 is preferably operated at an elevated pressure, preferably about 300 to about 500 p.s.i. and at oil inlet temperatures of 30–100° F. and gas inlet temperature in the range of about 50–125° F. Reboiling can be provided in this zone by coil 33 to increase the efficiency of the separation. A hydrogen concentrate of 50–90 volume percent hydrogen, preferably at least 60 volume percent, is removed by way of conduit 38. Sponge oil rich in $C_1$-$C_3$ hydrocarbons is removed from zone 32 through conduit 39, heated by heater 40, and passed by conduit 41 to flash zone 42 where absorbed light hydrocarbons are flashed out and removed by way of conduit 43 to suitable use. Lean hot sponge oil is removed by way of conduit 44. A portion of this hot sponge oil can be passed by way of conduit 58 through cooler 59 and conduit 60 to conduit 28 to be recycled to the absorption zone 32. The remainder of this hot sponge oil, along with the bottoms from fractionator 35 when this embodiment is used, is combined with the hydrogen concentrate of conduit 38 and passed to hydrocracking zone 45, wherein the hydrocarbons are hydrocracked to produce additional amounts of gasoline. This hydrocracking operation can, for example, be effected with a catalyst of molybdenum oxide or sulfide, cobalt molybdate or other conventional catalyst. Exact conditions of operation depend on the catalyst used, but these are ordinarily in the range of 700–1000° F., 1000–4000 p.s.i., 0.1–5 LHSV (liquid hourly space velocity), and 1000–10,000 cubic feet per hour of hydrogen per barrel of oil.

The hydrocracker effluent is separated in zone 47 into a $C_3$ and lighter fraction, a $C_4$-400° F. fraction, and a cycle oil fraction. The $C_3$ and lighter fraction removed by way of conduit 48 is combined with a similar stream in conduit 31 for recovery of its hydrogen content, and the $C_4$-400° F. fraction removed by way of conduit 49 can be blended directly as a gasoline product or can have its vapor pressure adjusted, for example, by removal of a part or all of the $C_4$ fraction, before blending in a manner similar to the fraction removed by way of conduit 23. A recycle fraction is removed by way of conduit 50 and can be returned by way of valve 51 and conduit 52 to the hydrocracking zone. Heavy tars can be removed through conduit 53 when conditions are maintained in the hydrocracking zone such that recycle to extinction is not feasible or desirable. Alternatively, under some conditions of operations (high pressure, high hydrogen ratio and relatively low temperature), the recycle fraction of conduit 50 can contain sufficient hydrogenated components to be useful as catalytic cracking stock; in this event, this fraction can be passed by way of conduit 54 to solvent extraction zone 25 for separation of these components.

Operations can, at times, produce more hydrogen than needed, and the excess can be removed by way of conduit 55 before purification. Also, in some refineries, significant amounts of relatively high purity hydrogen can be available as by-products of other operations; this can be introduced when desired by way of conduit 56.

It can be seen by study of this disclosure and the drawing that the combination of this invention is particularly advantageous in that the topped crude cracking step produces large quatities of hydrogen, and the hydrocracking step requires a large amount of hydrogen. In a preferred embodiment, at least a portion of the aromatic extract is used as sponge oil in the absorption step; use of this particular fraction as a sponge oil is highly advantageous in that carry-over of sponge oil with the hydrogen is immaterial because they are both ultimately charged to the hydrocracking unit. This hydrogen concentration by oil absorption of the contaminating light hydrocarbons using a sponge oil produced in the process, namely, the aromatic extract oil destined for the hydrocracking operation, makes immaterial the loss of sponge oil from the absorption zone, as the lost oil is carried to its intended conversion zone along with the hydrogen separated in the absorption zone. By use of this particular sponge oil, a very simple absorption zone without elaborate precautions against entrainment and other oil carry-over is quite satisfactory.

A West Texas crude is topped to about 570° F., and a 570–750° F. boiling range gas oil is then separated to produce a crude residue, the gas oil to residue ratio being about 4 to 5.

The gas oil plus raffinate oil (discussed later) is cracked in a fluid catalytic cracker at 900° F. with the following yields:

| | |
|---|---|
| $H_2$, s.c.f./bbl. feed | 60 |
| $C_1$-$C_3$, wt. percent of feed | 6 |
| $C_4$-400° F., vol. percent of feed | 47 |
| 400° F.+, vol. percent of feed | 50 |

The crude residue is cracked in a fluid catalytic cracker at 890° F. with the following yields:

| | |
|---|---|
| $H_2$, s.c.f./bbl. feed | 360 |
| $C_1$-$C_3$, wt. percent of feed | 4.5 |
| $C_4$-400° F., vol. percent of feed | 38 |
| 400° F.+, vol. percent of feed | 50 |

The two cracker effluents are combined and separated into a dry gas stream ($C_3$ and lighter), a $C_4$-400° F. fraction, and a cycle oil stream.

The cycle oil is extracted with sulfur dioxide, producing a raffinate oil in a proportion of 75 volume percent, the remainder being extract oil of 92 BMCI. The extract oil is fractionated to produce a 415–550° F. fraction; and the dry gas is countercurrently extracted, along with dry gas separated from the effluent of the later described hydrogenation zone, with this 415–550° F. aromatic fraction, producing a stream containing 85 volume percent hydrogen, the remainder being mostly methane. The rich oil from the extraction step is flashed to separate absorbed light hydrocarbons.

The heavy extract fraction and a portion of the flashed sponge oil not recycled to the extraction step are combined. The separated hydrogen stream, compressed to 1500 p.s.i.g., is added at the rate of 6000 c.f./bbl. to the combined extract oil stream at the same pressure; and the oil-hydrocarbon mixture is charged to a destructive hydrogenation unit operated at 800° F. The hydrocarbon effluent of the hydrogenation unit, exclusive of the unconsumed hydrogen, is:

| | Wt. percent |
|---|---|
| $C_1$-$C_3$ | 5 |
| $C_4$-400° F. | 20 |
| 400° F.+ | 75 |

Hydrogen consumption is about 1000 s.c.f./bbl.

The unconsumed hydrogen from the effluent, along with the $C_1$–$C_3$ fraction, is charged to the oil absorption system for recovery of the hydrogen; the $C_4$-400° F. fraction is debutanized and used as blending stock for gasoline; and the 400° F.+ fraction is charged to the solvent extraction system for separation into paraffiic cracking stock and extract oil.

Based on 900 barrels of virgin gas oil and crude residue, the charge to the crude cracker is 500 barrels. The charge to the clean oil cracker is 400 barrels of virgin gas oil and 600 barrels of raffinate oil. The charge to the destructive hydrogenation unit is 235 barrels. A slight excess of hydrogen is produced in the cracking operation over that consumed in the destructive hydrogenation step.

Reasonable variation and modification are possible within the scope of this disclosure, the drawing, and the appended claims to the invention, the essence of which is that there are provided process and apparatus for obtaining increased yields of gasoline wherein a gas oil and a topped crude oil are separately catalytically cracked, a hydrogen-rich stream and a cycle oil are separated from the cracked effluent, and an aromatic extract portion of the cycle oil is catalytically hydrocracked by addition of hydrogen from the hydrogen-rich stream to produce additional gasoline.

I claim:
1. A process for up-grading petroleum which comprises
   (a) catalytically cracking a topped crude oil,
   (b) catalytically cracking in a separate zone from that of step "a" a gas oil,
   (c) separating a hydrogen-rich gas from the cracked products of steps "a" and "b",
   (d) solvent-extracting the combined cracked products of steps "a" and "b" to produce a raffinate oil comprising paraffins and an extract oil comprising aromatics, and
   (e) utilizing the hydrogen-rich gas of step "c" for catalytically hydrocracking the extract oil of step "d".

2. The process of claim 1 wherein the separating of step "c" comprises scrubbing said cracked products with extract oil of step "d".

3. A process for increasing the recovery of gasoline from crude oil which comprises
   (a) fractionating said crude oil to produce a gas oil and a topped crude,
   (b) catalytically cracking said topped crude,
   (c) catalytically cracking in a separate zone from that of step "b" said gas oil,
   (d) combining the cracked effluents of steps "b" and "c,"
   (e) separating from the combined cracked effluent of step "d" a hydrogen-rich gas and a cycle oil,
   (f) separating said cycle oil by solvent extraction into a raffinate comprising paraffins and an extract oil comprising aromatics, and
   (g) catalytically hydrocracking said extract oil with addition of said hydrogen-rich gas from step "e" to produce a gasoline product.

4. The process of claim 3 wherein the separating of step "e" comprises fractionating said combined cracked effluent to product a $C_3$ and lighter stream, a gasoline product stream, and said cycle oil, scrubbing said $C_3$ and lighter stream with subsequently produced extract oil to absorb therefrom a major portion of the hydrocarbon content of said $C_3$ and lighter stream and to produce as the unabsorbed portion of said $C_3$ and lighter stream said hydrogen-rich gas, and flashing the thus-enriched extract oil to produce a light hydrocarbon product stream and extract oil for charging to the hydrocracking of step "g".

5. The process of claim 4 wherein said raffinate is recycled to the feed of the catalytic cracking of step "c".

6. A process for producing gasoline from crude oil which comprises
   (a) fractionating said crude oil to produce at least a gas oil and a topped crude,
   (b) catalytically cracking said topped crude,
   (c) catalytically cracking in a separate cracking zone from that of step "b" said gas oil,
   (d) combining the cracked effluents of steps "b" and "c",
   (e) fractionating the thus-combined effluents to produce a $C_3$ and lighter stream, a gasoline product stream, and a cycle oil stream,
   (f) solvent extracting said cycle oil stream to produce a raffinate comprising paraffins and an extract comprising aromatics,
   (g) recycling said raffinate to the feed of the catalytic cracking of step "c",
   (h) fractionating said extract to produce a light extract oil having an end point in the range of about 500° F. to about 600° F. and a heavy extract oil comprising the remainder of said extract.
   (i) contacting said light extract oil with said $C_3$ and lighter stream of step "e" to produce a hydrogen-rich gas stream and a light-hydrocarbon-enriched light extract oil,
   (j) flashing said light-hydrocarbon-enriched light extract oil to produce a light hydrocarbon product stream and a denuded extract oil,
   (k) combining said heavy extract oil with said denuded extract oil,
   (l) catalytically hydrocracking the combined stream of step "k" in the presence of hydrogen-rich gas from step "i", and
   (m) separating from the hydrocracked stream of step "l" additional gasoline product.

7. The process of claim 6 wherein there is additionally separated from the hydrocracked stream of step "l" a $C_3$ and lighter stream which is admixed with said $C_3$ and lighter stream of step "e", and a cycle oil fraction boiling above about 400° F. which is recycled to the hydrocracking of step "l".

8. The process of claim 6 wherein there is additionally separated from the hydrocracked stream of step "l" a recycle stream which is admixed with the cycle oil stream of step "e".

9. The process of claim 6 wherein a portion of the denuded extract oil of step "j" is cooled and admixed with the light extract oil of step "h".

10. Apparatus for producing gasoline comprising first catalytic cracking means, second catalytic cracking means, means for passing a topped crude oil to said first catalytic cracking means, means for passing a gas oil to said second catalytic cracking means, separation means, conduit means connecting each of said first and second catalytic cracking means to said separation means, solvent extraction means, means adapted to pass a cycle oil from said separation means to said solvent extraction means, catalytic hydrocracking means, means to pass an extract oil from said solvent extraction means to said hydrocracking means, means to pass a hydrogen-rich gas from said separation means to said hydrocracking means, and means for removing a gasoline product from said hydrocracking means.

References Cited by the Examiner
UNITED STATES PATENTS

| | | | |
|---|---|---|---|
| 2,352,025 | 6/44 | Seguy | 208—68 |
| 2,608,470 | 8/52 | Helmers et al. | 208—96 |
| 3,028,331 | 4/62 | Tucker | 208—124 |
| 3,050,457 | 8/62 | Wilson | 208—67 |
| 3,080,311 | 3/63 | Mertes | 208—112 |

ALPHONSO D. SULLIVAN, *Primary Examiner.*